(12) United States Patent
Tourapis et al.

(10) Patent No.: US 12,170,783 B2
(45) Date of Patent: Dec. 17, 2024

(54) VIDEO DISPLAY PREFERENCE FILTERING

(71) Applicant: APPLE INC., Cupertino, CA (US)

(72) Inventors: Alexandros Tourapis, Los Gatos, CA (US); Athanasios Leontaris, Cupertino, CA (US)

(73) Assignee: APPLE INC., Cupertino, CA (US)

(*) Notice: Subject to any disclaimer, the term of this patent is extended or adjusted under 35 U.S.C. 154(b) by 55 days.

(21) Appl. No.: 18/168,390

(22) Filed: Feb. 13, 2023

(65) Prior Publication Data
US 2023/0188733 A1    Jun. 15, 2023

Related U.S. Application Data

(63) Continuation of application No. 17/554,587, filed on Dec. 17, 2021, now Pat. No. 11,582,465, which is a
(Continued)

(51) Int. Cl.
| | |
|---|---|
| *H04N 19/176* | (2014.01) |
| *H04N 19/117* | (2014.01) |
| *H04N 19/14* | (2014.01) |
| *H04N 19/46* | (2014.01) |
| *H04N 19/86* | (2014.01) |

(52) U.S. Cl.
CPC ......... *H04N 19/176* (2014.11); *H04N 19/117* (2014.11); *H04N 19/14* (2014.11); *H04N 19/86* (2014.11); *H04N 19/46* (2014.11)

(58) Field of Classification Search
CPC .... H04N 19/61; H04N 19/117; H04N 19/176; H04N 19/86; H04N 19/82; H04N 19/46; H04N 19/14; H04N 19/80; H04N 19/136
See application file for complete search history.

(56) References Cited

U.S. PATENT DOCUMENTS

| | | | |
|---|---|---|---|
| 7,460,596 B2 | 12/2008 | Kwon et al. | |
| 2003/0086105 A1* | 5/2003 | Jostschulte | G06T 5/002 |
| | | | 348/E5.064 |

(Continued)

FOREIGN PATENT DOCUMENTS

| | | |
|---|---|---|
| WO | WO 2011/128056 A2 | 10/2011 |
| WO | WO 2012/096614 A2 | 7/2012 |

OTHER PUBLICATIONS

Joint Collaborative Team on Video Coding (JCT-VC) of ITU-T SG16 WP3 and ISO/IEC JTC1/SC29/WG11, 10th Meeting, Stockholm, SE, Jul. 11-20, 2012, 260 pages.

*Primary Examiner* — Farhan Mahmud
(74) *Attorney, Agent, or Firm* — BakerHostetler

(57) ABSTRACT

Video coding schemes may include one or more filters to reduce coding artifacts and improve video quality. These filters may be applied to decode video data in a predetermined sequence. The output from one or more of these filters may be selected for different images, blocks, or sets of video data and then copied and/or routed to a display or a buffer storing reference data that is used to decode other video data in a data stream. Providing the ability to select which filter output is used for display and as a reference may result in better video quality for multiple types of video data. The filters that are selected for display and for reference may be different and may vary for different images, blocks, and data sets.

20 Claims, 5 Drawing Sheets

Related U.S. Application Data continuation of application No. 13/758,544, filed on Feb. 4, 2013, now Pat. No. 11,240,515.

(60) Provisional application No. 61/699,179, filed on Sep. 10, 2012.

(56) References Cited

U.S. PATENT DOCUMENTS

| | | | |
|---|---|---|---|
| 2004/0179610 A1* | 9/2004 | Lu | H04N 19/80 375/240.25 |
| 2009/0290805 A1* | 11/2009 | Hattori | H04N 19/61 382/233 |
| 2010/0158103 A1 | 6/2010 | Ye et al. | |
| 2011/0317764 A1* | 12/2011 | Joshi | H04N 19/82 375/E7.188 |
| 2012/0051438 A1* | 3/2012 | Chong | H04N 19/42 375/E7.027 |

* cited by examiner

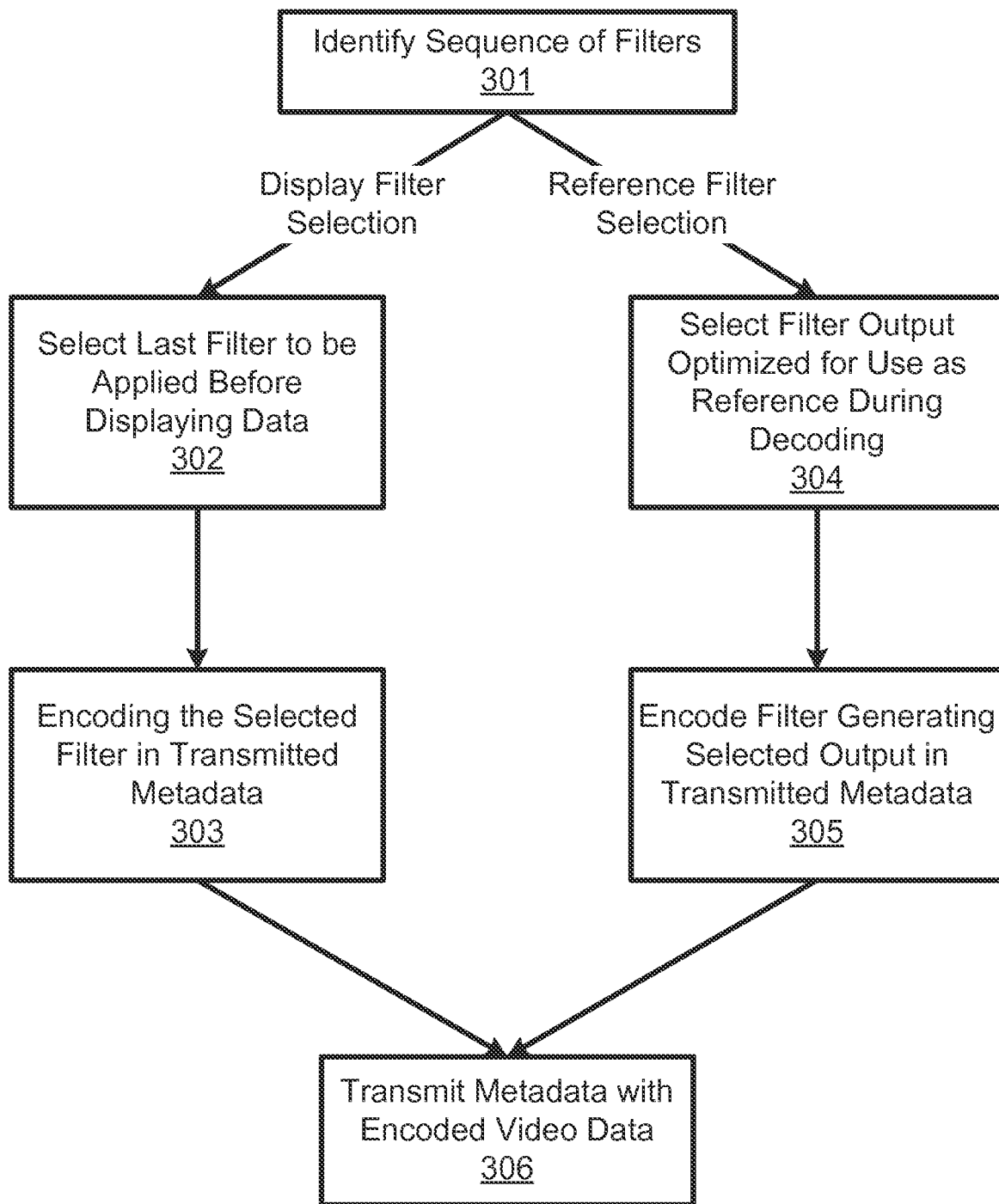

VIDEO DISPLAY PREFERENCE FILTERING

CLAIM FOR PRIORITY

This application is a Continuation of U.S. patent application Ser. No. 17/554,587, filed on Dec. 17, 2021, which is a Continuation of U.S. patent application Ser. No. 13/758,544, filed on Feb. 4, 2013, now allowed, which claims benefit under 35 U.S.C. § 119 (e) of Provisional U.S. Patent Application No. 61/699,179, filed Sep. 10, 2012 and entitled "Video Display Preference Filtering," the disclosure of which is incorporated herein in its entirety.

BACKGROUND

Existing video coding standards and technologies use block-based methods for coding video information. Such methods included intra and inter prediction, as well as transform, quantization, and entropy coding processes. Intra and inter prediction used spatio-temporal correlation to compress the video data, whereas the transform and quantization processes corrected any errors that may have been incurred due to inaccuracies in prediction for a selected bitrate or target quality. The quantization level for each block was adjustable and entropy encoding was used to further compress the resulting data.

Although substantial compression of an image or of video data was achieved, the use of block-based methods has resulted in unwanted coding artifacts that deteriorate the perceived quality of the image or video. To minimize these unwanted artifacts, in-loop or out of loop processing methods, such as a deblocking filter and/or a sample adaptive offset (SAO) technique have been applied to image and video data after reconstruction. Other techniques, such as adaptive loop filtering (ALF) have also been used.

Deblocking filters have commonly analyzed information about a region or block that has been coded, and then employ filtering strategies in an attempt to reduce any detected coding artifacts. The information that was analyzed included: (i) the intra- or inter-type of coding mode used for prediction, (ii) the motion vectors and their differences between adjacent blocks, (iii) the presence of residual data, and (iv) the characteristics and differences between filtered samples. Quantization parameters and other characteristics were selected to maximize the ability to detect coding artifacts.

While deblocking is directed to maximizing the ability to detect coding artifacts, SAO has classified the reconstructed samples into different categories, and minimized the distortion in each category by adding a category specific offset. The classification of a sample was based on pixel intensity or edge characteristics of the sample. SAO parameters could be associated with an entire picture or on a per region basis. ALF also applied an additional, Wiener-like filter over all samples in an image or region to further reduce distortion based on parameters specified within a region of an image, e.g. a slice, an entire image, or video bitstream. Once the filtering process was complete, the processed images were send to a decoder picture buffer where the processed images were used as reference images for subsequent images and were outputted to a display.

Using the processed images as both reference images for analyzing subsequent images and as output images for the display may add unnecessary delay to the display process, which need not be processed through the deblocking and/or SAO filter stages. Additionally, optimizing the filters to provide best image quality for displaying the processed images may result in reduced quality reference pictures for prediction and vice versa. Additionally, in those instances where external post-processing schemes have been applied to processed images prior to displaying them, the post-processing schemes may cancel or negate the effects of the filters applied during filtering. For example, in those situations where noise or film grain effects have been added to video frames for artistic purposes, such as to generate the appearance of a vintage film clip, the noise and other effects may be removed by the filters such as the deblocking and SAO filters. In these instances, it would be desirable to bypass the filters to preserve the artistic aspects of the film.

Some video coding formats provide for optional message codes that, when included in a data stream, enable a decoder to bypass the deblocking and SAO filters and display the image prior to deblocking if desired. This could allow the encoder to fully optimize the deblocking process for prediction, instead of both prediction and display since the images are outputted to the display before the deblocking filter is applied. One limitation of this approach is that the message codes to enable this functionality are optional, and therefore different decoders may ignore them altogether so that the displayed images may appear differently on different devices depending on whether the message codes were ignored or not.

Another limitation of this approach is that the message codes only provide two options—either outputting the decoded images for display before applying any filters, such as deblocking or SAO, or after all filters have been applied. By only providing these two options, the process ignores the cascaded nature of filter designs. In particular, in some instances it may be desirable to provide additional message codes that allow the decoder to output decoded images not only prior to deblocking and after all in-loop processing steps have been completed, but also in between different applied filters.

FIG. 1 shows a simplified block diagram of a prior art system 100 that included components for encoding and decoding video data.

The system 100 may include a subtractor 112, a transform unit 114, a quantizer 116 and an entropy coding unit 118. The subtractor 112 may receive an input motion compensation block from a source image and a predicted motion compensation block from a decision unit 150. The subtractor 112 may subtract the predicted block from the input block and generate a block of pixel residuals. The transform unit 114 may convert the residual block data to an array of transform coefficients according to a spatial transform, typically a discrete cosine transform ("DCT"), a discrete sine transform ("DST"), or a wavelet transform. The quantizer 116 may truncate transform coefficients of each block according to a quantization parameter ("QP"). The QP values used for truncation may be transmitted to a decoder in a channel. The entropy coding unit 118 may code the quantized coefficients according to an entropy coding algorithm, for example, a variable length coding algorithm. Additional metadata containing the message, flag, and/or other information discussed above may be added to or included in the coded data, which may be outputted by the system 100.

An inverse quantization unit 122, an inverse transform unit 124, an adder 126, a deblocker 140, a SAO filter 142, a picture buffer 144, a motion estimator 146, a motion compensated predictor 148, and a decision unit 150 may be used to decode video data. The inverse quantization unit 122 may quantize coded video data according to the QP used by the quantizer 116. The inverse transform unit 124 may transform re-quantized coefficients to the pixel domain. The adder 126 may add pixel residuals output from the inverse transform unit 124 with predicted motion data from the motion compensated predictor 146. The summed output from the adder 126 may then be filtered at a deblocking filter 140. The output from the deblocking filter 140 may then be further filtered by a SAO filter 142. The buffer 144 may store recovered frame data as outputted and filtered by the SAO filter 142 for use as reference frames during coding of later-received blocks.

The motion estimator 146 may estimate image motion between a source image being coded and reference frame(s) stored in the buffer 144. For example, it may select a prediction mode to be used (for example, unipredictive P-coding or bipredictive B-coding), and generate motion vectors for use in such predictive coding. The motion compensated predictor 148 may generate a predicted motion compensated block for use by the block coder. In this regard, the motion compensated predictor 148 may retrieve buffered block data of selected reference frames from the buffer 144.

As discussed previously, in prior art coding systems, there were only two options for specifying when, during the decoding process, the decoded data should be sent to a display. These two options included outputting the decoded data before applying any filters, such as deblocking filter 140, or outputting the decoded data after all filters have been applied, such as after SAO filter 142. Additionally, prior art coding systems did not provide any options for dynamically selecting or changing the type of reference data stored. As shown in FIG. 1, the reference data stored in the buffer was the filtered output from SAO filter 142.

There is a need for more flexible coding systems that provide additional options for specifying when during the decoding process the decoded data should be sent to a display and when during the decoding process the decoded data should be stored as reference data for decoding and/or encoding subsequent video data.

BRIEF DESCRIPTION OF THE DRAWINGS

FIG. 3 shows a first exemplary process in an embodiment of the invention.

DETAILED DESCRIPTION

Figure 1:
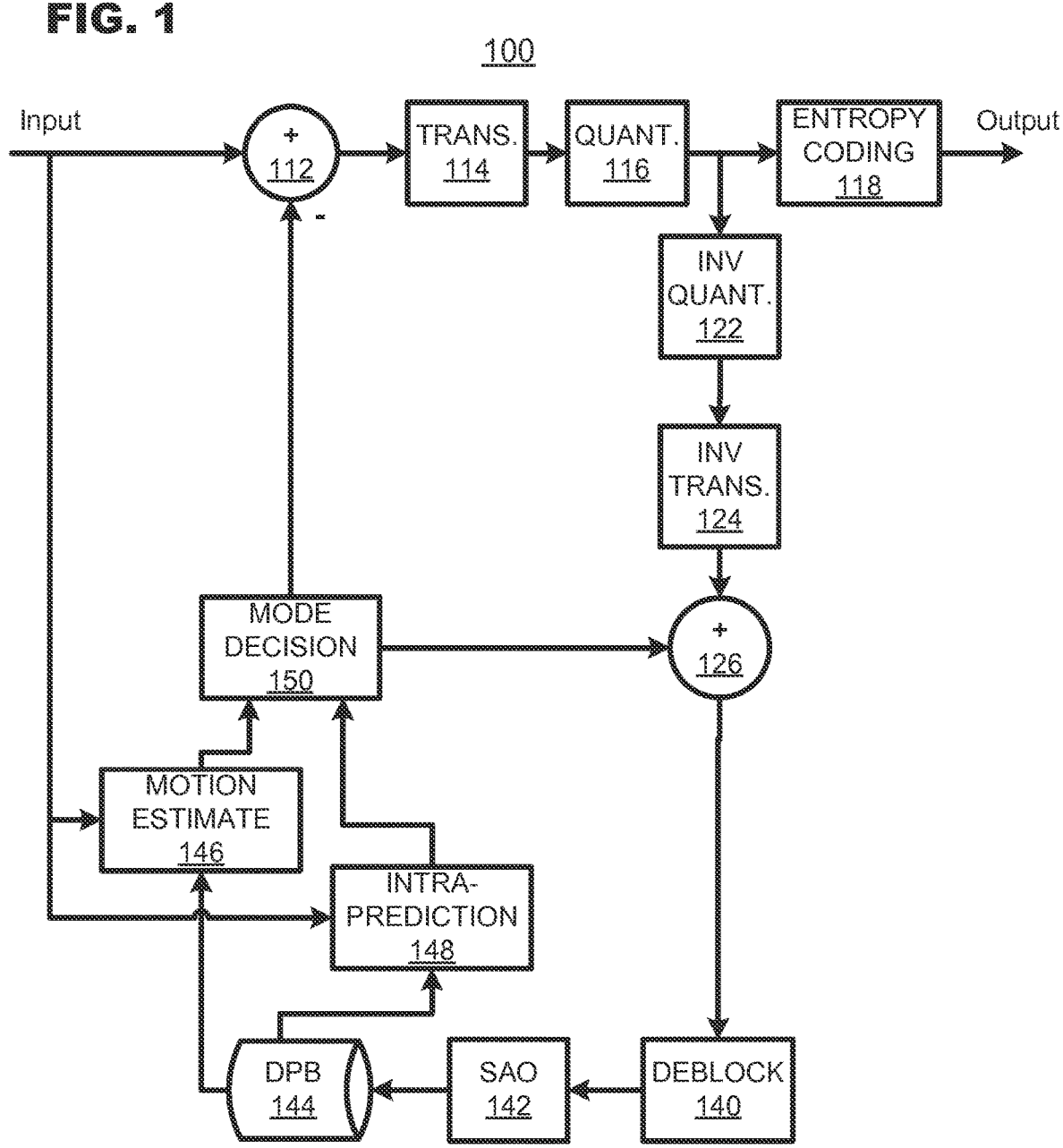
FIG. 1 shows a block diagram of a prior art system.

Video coding schemes may include one or more filters, such as a deblocking filter and a SAO filter to reduce coding artifacts and improve video quality. These filters may be applied to decoded video data in a predetermined sequence. In different embodiments of the invention, one or more of these filters may be selected. Decoded video data may then be copied and/or routed to a display or a buffer storing reference data that is used to decode and/or encode subsequent video data in a data stream before or after the selected filters is applied to the decoded video data. The filters that are selected for outputting the video data to a display may be different from the filters that are selected for storing reference video data in the buffer. The selected filters may also be changed for different sets of video data, which may include different images or blocks.

The selection of the filters applied to video data routed to the display and routed to the buffer may be determined during a video encoding process. The filter selection information for each set of video data may be encoded in metadata that is associated with the respectively encoded video data. In some instances, messages or additional flags could be added to the metadata. The additional flags or messages may indicate where in the filtering sequence the video data should be outputted to a display. For example, in some instances a one-bit "display_prior_to_deblocking_preferred" flag may be replaced with a variable "display_preference_filter_entry_point" flag or message having multiple values. If the value is a first value, then a normal process is used. If the value is a second value, then output for display may be taken prior to applying a first filter in the sequence, whereas if the value is a third value, the output for display may be taken after applying the first filter and prior to the second filter. If more filters are present, then each increment in the value of this parameter may correspond to the respective filter position from where the display output is to be extracted.

Additional flags or messages may also be included to identify different post-filtering methods that may be applied to the video data routed to the display. For example, in some instance, a same filter may be applied to both the video data being decoded and used for predicting subsequent decoded images and the video data being decoded and used for display, although the filter thresholds or parameters may be different for the data that is sent to the display. An additional flag or message containing the different parameters that are to be applied for display only filtering may be included in the metadata in these instances.

In some video coding schemes, the inclusion or use of these additional messages and flags in metadata may be considered optional and need not be enforced by a decoder or application. To make instructions mandatory, the filter selections may be moved from the optional metadata fields into mandatory fields such as picture parameter sets in some video coding schemes. Additionally, by making the filter selections for output to a display and/or for storage as reference data in a buffer mandatory, the decoders in some instances may need to include additional memory to accommodate the additional copies of video data being sent to the buffer and/or the display as the video data is passed through the sequence of filters.

In one embodiment, a second display buffer, which may be the same size as an original video data buffer, may be provided. The second display buffer may be linked to the original buffer. The original buffer may be used to store the reference video data used to decode subsequent video data in a stream, while the second buffer may be used to store video data that is to be sent to the display. Any picture management operations or filtering operations that are performed to the video data in the original buffer may also be applied to the video data in the second buffer until either the data in the second buffer is routed to the display based on the filter selection or the output from the selected filter that is used a reference data is generated. If, however, there are different parameters specified for the data that is to be routed to the display instead of used as reference data, then the different parameters may be applied to the respective video data in the respective buffers.

In another embodiment, instead of providing a second buffer, the original buffer may be extended up to a maximum buffer size. In this embodiment, both display and reference data may be stored in the original buffer. In some instances, related video data, such as video data in the buffer processed for display instead of processed for reference purposes, may be linked to make it easier to maintain, update, or remove the data from the buffer.

In some instances, prediction techniques may be applied to not only the reference data stored in the buffer, but also the display data. The use of these prediction techniques in this manner may be specified in list creation instructions that may be included in the metadata. Specifying in the metadata whether predictions techniques are applicable to particular regions of video data, may result in improved image quality in regions where filtering is useful for prediction versus other regions which may benefit from unfiltered or less filtered video data.

In another embodiment, the original buffer may store only the video data being routed to the display. Other video data that is used as reference data for decoding subsequent video data in a stream may be generated only when needed to predict and/or decode the subsequent video data. Once the reference data is no longer needed for decoding, the reference data may be discarded. Although this embodiment may require less memory, it may also increase the complexity of the process and limit the ability to fully process video data.

For example, certain filters, such as deblocking filters, rely on dependencies between vertical and horizontal image processing. These dependencies between the vertical and horizontal edges could be removed. For example, three categories of edges—corner, horizontal, and vertical—may be created. Corner edges may correspond to corner points in blocks, macroblocks, or coding units. Both horizontal and vertical edges may exclude samples classified as corner samples. Each of these categories may also have their own deblocking filter strength derivation and filtering process. Each category may also use unfiltered samples. The horizontal and vertical edge filtering methods may be equivalent to existing methods, such as in AVC and HEVC coding schemes. For the corner filtering method, the motion and mode characteristics of four or more neighboring blocks may be examined. Filtering may be performed across these four or more neighbors. Corner edges may also be classified differently if they correspond to a single pixel or impacting a number N of additional pixels in the horizontal and/or vertical directions that have not been considered in the horizontal and/or vertical edge methods.

In some instances, an on-demand filter selection may be implemented. With on-demand filter selection, different filters and filter parameters may be selected for different reference data, different coded pictures, or even for different slices of video data. The selected filters and/or filter parameters may be changed for every picture that is coded and may result in improved coding performance over the use of fixed filters.

Figure 2A:
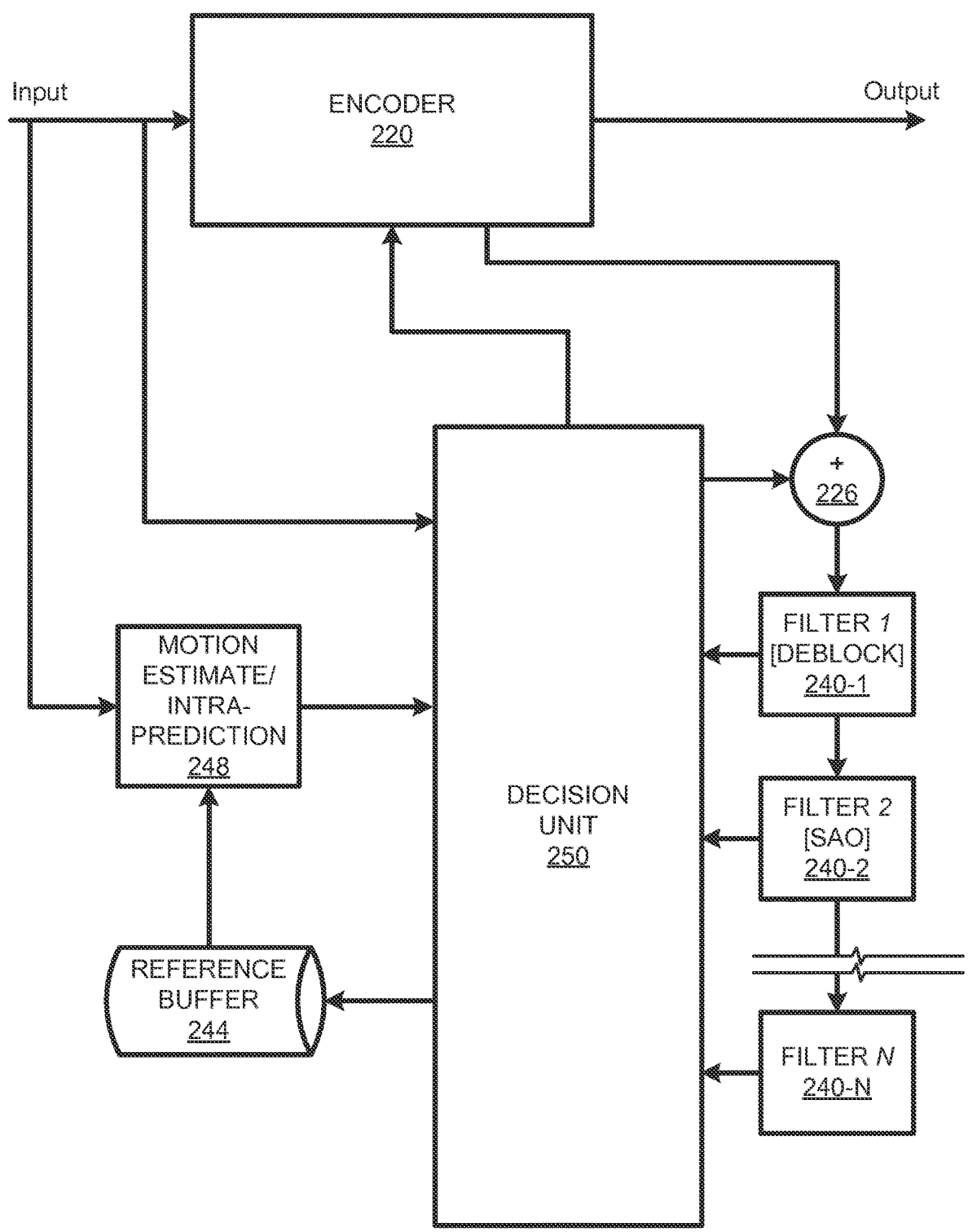
FIG. 2A shows a block diagram of an encoding system in an embodiment of the invention.

FIG. 2A shows a simplified block diagram of an image processor encoding system 200 in an embodiment of the invention that includes components for encoding video data.

The system 200 may include an encoder 220, a decision unit 250, an adder 226, a reference buffer 244, one or more filters 240, and a motion estimator and/or intra-prediction unit 248.

The encoder 220 may include a subtractor, a transform unit, a quantizer, an inverse transform unit, an inverse quantizer, and/or an entropy coding unit. The subtractor may receive an input motion compensation block from a source image and a predicted motion compensation block from the decision unit 250. The subtractor may subtract the predicted block from the input block and generate a block of pixel residuals. The transform unit may convert the residual block data to an array of transform coefficients according to a spatial transform, typically a discrete cosine transform ("DCT") or a wavelet transform. The quantizer may truncate transform coefficients of each block according to a quantization parameter ("QP"). The QP values used for truncation may be transmitted to a decoder in a channel. The entropy coding unit may code the quantized coefficients according to an entropy coding algorithm, for example, a variable length coding algorithm. Additional metadata containing the message, flag, and/or other information discussed above may be added to or included in the coded data, which may be outputted by the system 200.

The inverse quantization unit, the inverse transform unit, adder 226, one or more filters 240-1 to N, a reference buffer 244, the motion estimator and/or compensated predictor 248, and the decision unit 250 may also be used to encode video data. The inverse quantization unit may quantize coded video data according to the QP used by the quantizer. The inverse transform unit may transform re-quantized coefficients to the pixel domain. The adder 226 may add pixel residuals output from the inverse transform unit with predicted motion data from the motion compensated predictor 248. The summed output from the adder 226 may then be filtered at one or more filter 240-1 to N. The one or more filters may, but need not, include a deblocking filter and/or a SAO filter. The filters 240-1 to N may be arranged in a linear sequence so that video data is filtered through the first filter, and the output of the first filter is then filtered through the second filter, and so on.

The reference buffer 244 may store recovered frame data as outputted by one or more of the adder 226 and/or filters 240-1 to N for use as reference frames during coding of later-received blocks. The recovered frame data that is stored in the reference buffer 244 may vary for different images or sets of video data. For example, for some blocks of video data, the output from only filter 240-1 may be stored as reference data in buffer 244. For other images or blocks, the output from both the adder 226 and filter 240-2 may be stored as reference data. In other instances the output from filter 240-N may be stored as reference data. During encoding the recovered frame data that is to be stored in buffer 244 may be specified and included in the metadata transmitted with the encoded video data.

Each of the filters 240-1 to N may be arranged in a predetermined sequence. The decision unit 250 may identify a filter 240 in the predetermined sequence 240-1 to N having an output that is to be used as a reference for coding subsequent video data in an input video stream. The filter that is identified by the decision unit 250 may change for different sets of video data in the stream. A processing device 221, which may be part of the encoder/decoder 220, may encode the video data in the input stream and also encoding the identifying filter as part of metadata that is transmitted with the encoded video data. The resulting encoded video data and metadata may then be outputted by the image processor system 200.

In some instances, the decision unit 250 may also identify a filter 240 in the predetermined sequence 240-1 to N having an output that is to be routed to a display to be shown to a user during decoding. A processing device may encode this identified filter having its output to be routed to the display as part of the metadata that is transmitted with the encoded video data and outputted by the image processor system 200.

In some instances, the decision unit 250 may identify a filter 240 in the sequence 240-1 to N having its output used a either reference data or displayed to user based on a user supplied filter selection input. In other instances, the decision unit 250 may identify the filter 240 in the sequence 240-1 to N based on data included in the input stream.

The decision unit 250 may also identify a filter 240 in the predetermined sequence 240-1 to N having an output used as a reference for decoding subsequent video data in an encoded video stream from metadata included in the encoded video stream. The identified filter that is encoded in the metadata may also vary for different sets of video data in the stream. A processing device 251, which may be part of the decision unit 250, may route the output from the identified filter in the sequence 240-1 to N the reference buffer 244, which may store reference data. The encoder 220 may decode subsequent video data in an encoded video data stream based on the reference data stored in the reference buffer 244.

In some instances, a display buffer 245 may be used to store the output of an identified filter that is to be routed to the display and shown to a user. The display buffer 245 may store the output of the identified filter as part of the routing of the output to the display. In some instances, the reference buffer 244 and the display buffer 245 may be part of a single buffer 243, but in other instances the reference buffer 244 and the display buffer 245 may be separate buffers.

The motion estimator 248 may estimate image motion between a source image being coded and reference frame(s) stored in the buffer 244. For example, it may select a prediction mode to be used (for example, unipredictive P-coding or bipredictive B-coding), and generate motion vectors for use in such predictive coding. The motion compensated predictor 248 may generate a predicted motion compensated block for use by the block coder. In this regard, the motion compensated predictor 248 may retrieve buffered block data of selected reference frames from the buffer 244.

Figure 2B:
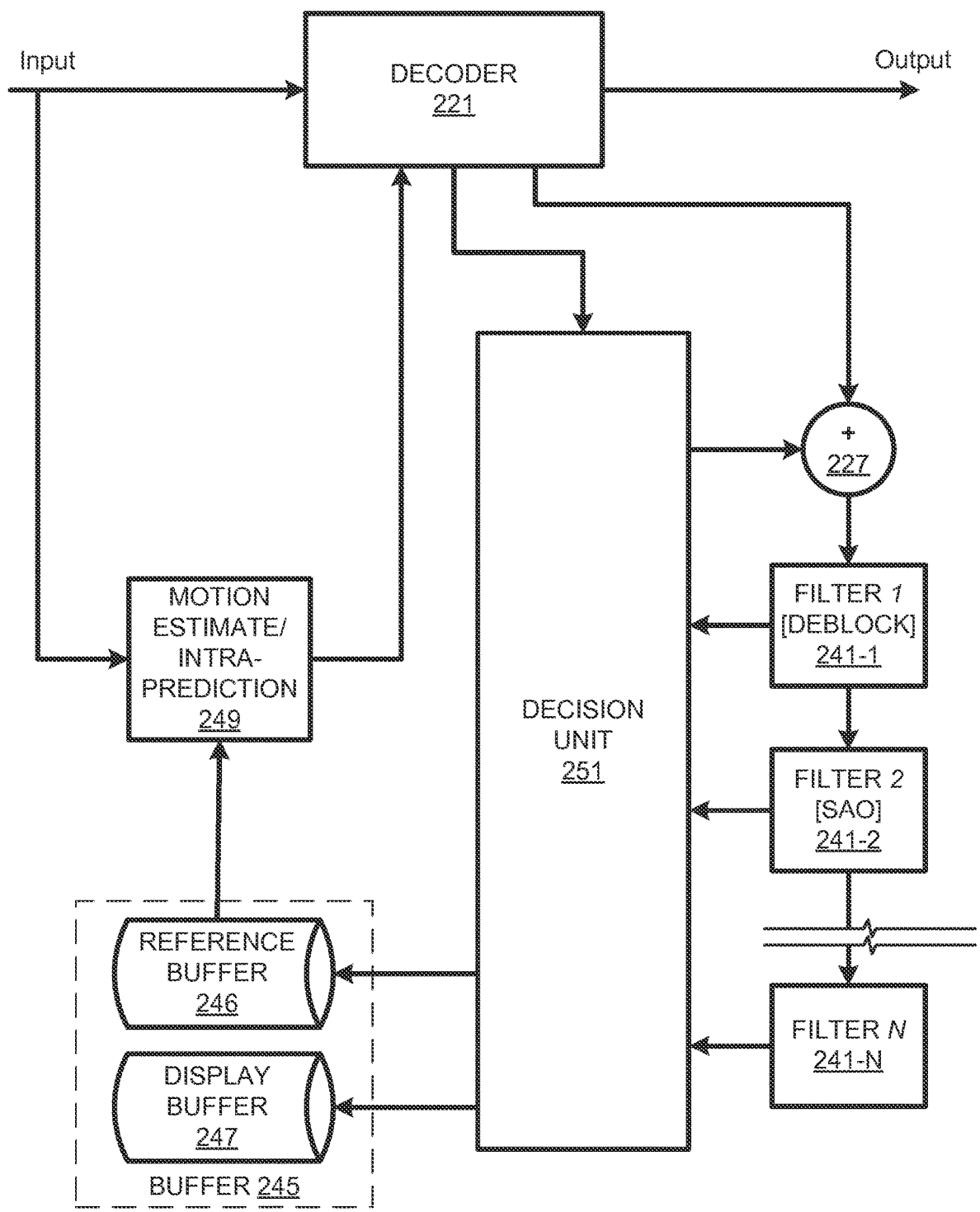
FIG. 2B shows a block diagram of a decoding system in an embodiment of the invention.

FIG. 2B shows a simplified block diagram of an image processor decoding system 260 in an embodiment of the invention that includes components for encoding video data.

The system 260 may include a decoder 221, a decision unit 251, an adder 227, a reference buffer 246, one or more filters 241, and a motion estimator and/or intra-prediction unit 249.

The decoder 221 may include some or all of the functionality included in the encoder 220 to decode encoded data. For example, the decoder 221 may include an adder to add a decoded input motion compensation block from a source image to a predicted motion compensation block from the decision unit 251 or motion estimator/prediction unit 249. The decoder 221 may also include an inverse quantization unit, an inverse transform unit, and other components needed to decode an encoded image stream. The inverse quantization unit may quantize coded video data according to the QP used by a quantizer. The inverse transform unit may transform re-quantized coefficients to the pixel domain. The adder 227 may add pixel residuals output from the inverse transform unit with predicted motion data from the motion compensated predictor 248. The summed output from the adder 227 may then be filtered at one or more filters 241-1 to N. The one or more filters may, but need not, include a deblocking filter and/or a SAO filter. The filters 241-1 to N may be arranged in a linear sequence so that video data is filtered through the first filter, and the output of the first filter is then filtered through the second filter, and so on.

The reference buffer 246 may store recovered frame data as outputted by one or more of the adder 227 and/or filters 241-1 to N for use as reference frames during decoding of later-received blocks. The recovered frame data that is stored in the reference buffer 246 may vary for different images or sets of video data. For example, for some blocks of video data, the output from only filter 241-1 may be stored as reference data in buffer 246. For other images or blocks, the output from both the adder 227 and filter 241-2 may be stored as reference data. In other instances the output from filter 241-N may be stored as reference data. Metadata included in the encoded video data transmitted to the receiver may specify which of the filters 241-1 to N may be applied to the decoded data before storing the filtered decoded data in reference buffer 246.

The recovered frame data that is outputted for display may also vary for different images or sets of video data. For example, for some blocks of video data, the output from only filter 241-1 may be sent to a display. For other images or blocks, the output from the adder 227 may be sent to the display. In other instances the output from another filter 241-1 to N may be sent to the display. During encoding the selection of the particular filters, if any, that are to be applied to the recovered frame data that is to be sent to the display and/or used to decode other image data may be specified and included in the metadata 252 transmitted with the encoded video data. This metadata may also be used in the decoding process to identify which of the filters 241-1 to N may be applied to the decoded data before outputting the filtered decoded data to a display, storing the filtered decoded data in display buffer 247 for output to the display.

Each of the filters 241-1 to N may be arranged in a predetermined sequence. The decision unit 251 may identify a filter 241 in the predetermined sequence 241-1 to N having an output that is to be used as a reference for coding subsequent video data in an input video stream. The filter that is identified by the decision unit 251 may change for different sets of video data in the stream and may be specified in metadata transmitted with the encoded image data. A processing device, which may be part of the decoder 221, may decode the video data in the input stream and identify the filter(s) specified in the metadata that are to be applied to the decoded video data before outputting the decoded data to a display and/or using the decoded data during the decoding of subsequent image data.

In some instances, the decision unit 251 may select the last filter 241 in the predetermined sequence 241-1 to N that is to be applied to the decoded video data based on the filter identified in the metadata. The decision unit 251 may identify the last filter for the output to the reference buffer 246 and/or the output to the display or display buffer 247.

FIG. 3 shows exemplary methods for encoding video data with metadata specifying particular filter stages at which video data is to be sent to a display or saved in a buffer for use as a reference during the analysis of subsequent video data. The methods may be performed by a processing device or stored as a set of instructions in a computer readable medium that when executed by the processing device, cause the processing to perform the method.

In box 301, a sequence of filters applied to decoded video data in a video coding scheme may be identified. In some instances, the identified sequence may include a set of N filters 240 that may be applied in a linear and sequential order to a set of video data.

Boxes 302 and 303 may apply to methods relating to the selection of filter stages for outputting video data for display on a screen or other display device. Boxes 304 and 305 may apply to methods relating to the selection of filter stages for video data that is to be saved in a buffer for use as a reference during the coding of subsequent video data.

In box 302, a last or $M^{th}$ filter in the identified sequence of N filters that is to be applied to a respective set of video data during decoding before outputting the respective decoded video data to a display may be selected. The last filter selected in box 302 may be any of the filters in the set of N filters. Additionally, an option of no filtering may also be selected as the last filter in box 302. In this case of no filtering, the decoded video data may be directly outputted for display before any of the filters are applied to the decoded video data. The selected last filter in box 302 may also vary for different sets of video data. Thus, for some images, blocks, or sets of video data, a first filter in the sequence may be selected as the last filter for a display output whereas for others a second, third, or other filter may be selected as the last filter, and for yet others, a no filtering option may be selected as the last filter so that the decoded data is directly sent for display without any filtering.

In box 303, the selected last filter in box 302 for each of the video data sets may be encoded in metadata that is transmitted with the encoded video data to a decoder. In some instances, the selected last filter information may be encoded as a message or flag as discussed above, but in other instances, different encoding schemes may be used. The metadata may be coded to instruct a decoder to redirect the decoded video data to the display after the decoded video data is processed by either the last filter specified in the metadata or before any filter is applied.

In box 304, a filter in the identified sequence that generates an output of filtered video data optimized for use as a reference during subsequent decoding may be selected. The filter that is selected in box 304 may be based on the type of the video data to be encoded as different filters may generate an output optimized for different types of video data. The selected filter in box 304 may also vary for different images, blocks, or sets of video data. Thus, for some images, blocks, or sets of video data, a first filter in the sequence may be selected so that the output of the first filter may be stored in a buffer for use as a reference during subsequent coding analyses. For other images, blocks, or sets of video data, a second, third, or other filter may be selected, and for yet others, a no filtering option may be selected as the last filter so that the decoded data is sent directly to the buffer before any filtering is applied to the data.

In box 305, the selected filter in box 304 for each of the video data sets may be encoded in metadata that is transmitted with the encoded video data to a decoder. In some instances, the selected filter information may be encoded as a message or flag as discussed above, but in other instances, different encoding schemes may be used. The metadata may be coded to instruct a decoder to redirect the decoded video data to the display after the decoded video data is processed by either the filter specified in the metadata or before any filter is applied.

In box 306 the encoded metadata in boxes 303 and/or 305 may be transmitted with the corresponding encoded video data to a decoder.

Figure 4:
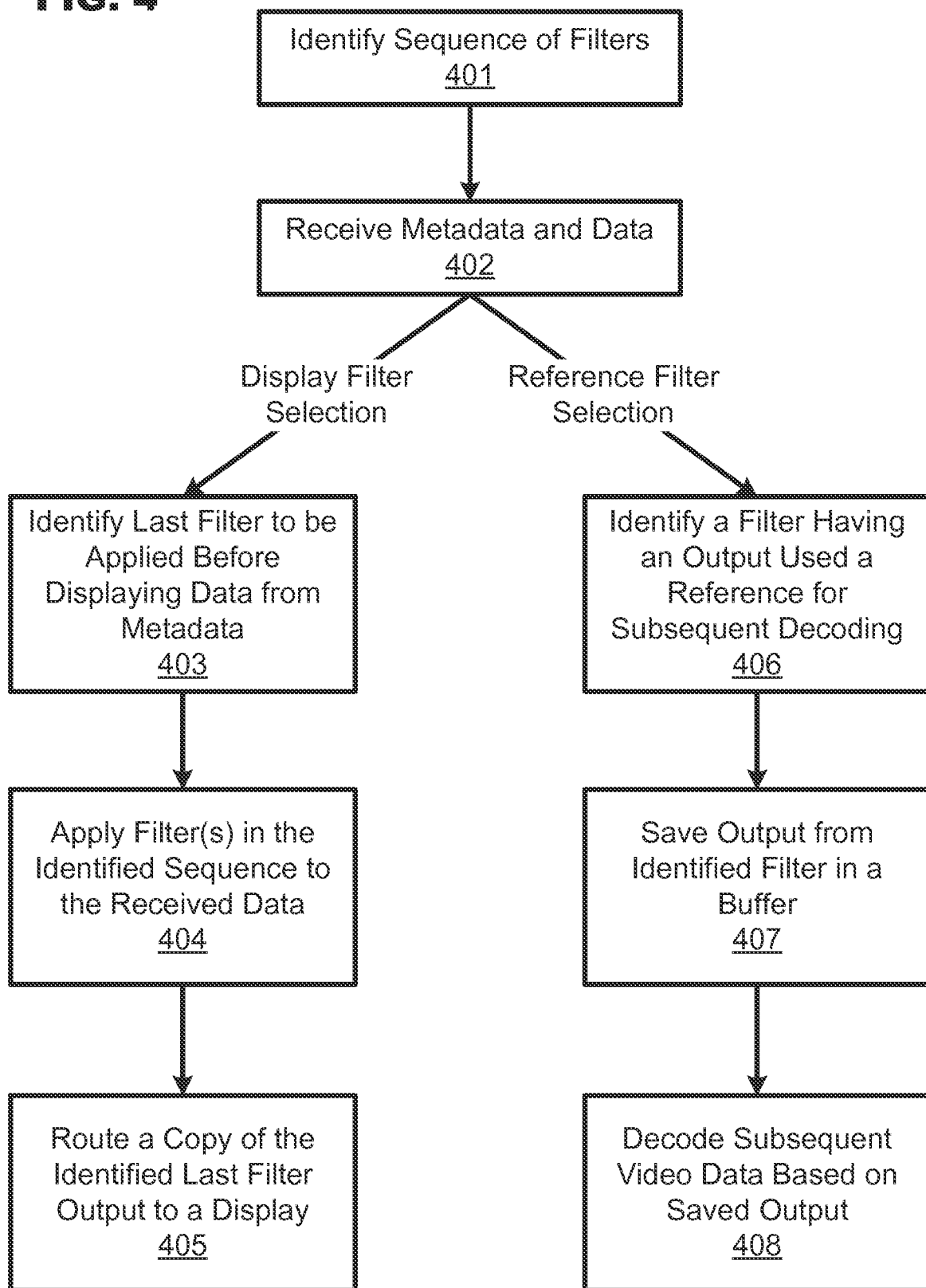
FIG. 4 shows a second exemplary process in an embodiment of the invention.

FIG. 4 shows exemplary methods for decoding video data including metadata specifying particular filter stages at which video data is to be sent to a display or saved in a buffer for use as a reference during the analysis of subsequent video data. The methods may be performed by a processing device or stored as a set of instructions in a computer readable medium that when executed by the processing device, cause the processing to perform the method.

In box 401, a sequence of filters applied to decoded video data in a video coding scheme may be identified. In some instances, the identified sequence may include a set of N filters 240 that may be applied in a linear and sequential order to a set of video data.

In box 402, the encoded video data including its corresponding metadata may be received by a video decoding device that decodes the video data according to a particular video coding scheme.

Boxes 403 to 405 may apply to methods relating to routing of particular decoded video data to a screen or other display device for display to a user. Boxes 406 to 408 may apply to methods relating to the identification of particular decoded video data that is to be saved in a buffer for use as a reference during the decoding of other video data in a data stream.

In box 403, a last or $M^{th}$ filter in the identified sequence that is to be applied to a respective set of video data during decoding before outputting the respective decoded video data to a display may be identified from the metadata. In some instances, the last filter information may be identified from a message or flag that is included in the metadata as discussed above, but in other instances, the filter information may be encoded differently in the metadata.

The identified last filter in box 403 may be any of the filters in the set of N filters. Additionally, an option of no filtering may also be selected as the last filter in box 403. In this case of no filtering, the decoded video data may be directly outputted for display before any of the filters are applied to the decoded video data. The selected last filter that is included in the metadata may also vary for different sets of video data. Thus, for some images, blocks, or sets of video data, the metadata may specify that a first filter in the sequence is the last filter for a display output whereas for others a second, third, or other filter may be specified as the last filter, and for yet others, a no filtering option may be selected as the last filter so that the decoded data is directly sent for display without applying any of the filters.

In box 404, one or more filters may be applied to decoded video data according to the filter sequence identified in box 401. The filters may be applied to a set of the decoded video data in the identified sequence at least until the last filter specified in the metadata and identified in box 403 has been applied to the data. In the case where the metadata specifies no filtering as the last filter, then none of the filters may be applied to the decoded video data before the decoded video data is routed for display.

In box 405, a copy of the set of video data outputted by the last filter specified in the metadata and identified in box 404 may be routed to a display device for display to a user. In some instances, a copy of the outputted video data may be routed to the display. Also, in some instances, additional algorithms, transformations, processing functions, or filters may be applied to the video data routed to the display before it is actually displayed to the user. For example, in some instances, an additional number of K sequential filters that are separate from the identified sequence of N filters may be applied during decoding for display purposes after the selected $M^{th}$ sequential filter and before outputting the respective decoded video data to the display. This filter selection of the K sequential filters may be encoded as metadata transmitted with the encoded video data to the decoder.

In box 406, a filter in the identified sequence having an output that is to be used as reference for decoding other video data in a stream may be identified from the metadata. In some instances, the filter information in box 406 may be identified from a message or flag that is included in the metadata as discussed above, but in other instances, the filter information may be encoded differently in the metadata.

The identified filter in box 406 may be any of the filters in a set of filters, such as the set of N filters discussed above.

Additionally, an option of no filtering may also be specified in the metadata. In this case of no filtering, the decoded video data may be directly sent to a buffer or otherwise stored as a reference for decoding other data in the stream before any of the filters are applied to that data. The filter specified in the metadata may also vary for different sets of video data. Thus, for some images, blocks, or sets of video data, the metadata may specify that a first filter in the sequence is the filter with an output that is to be used as reference whereas for others a second, third, or other filter output may be specified as the filter for the reference data, and for yet others, a no filtering option may be specified as the filter so that the decoded data is directly used as the reference sent for display without applying any of the filters.

In box 407, the output from the identified filter in box 406 for each respective set of transmitted video data may be saved in a buffer storing reference data used to decode other video data according to the video coding scheme.

In box 408, the other video data may be decoded based on the saved output stored as reference data in the buffer.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, in different embodiments different filter types other than the deblocking and/or SAO filters 240 may be used as the first and/or second filters.

The foregoing discussion, including the discussion of the processes shown in FIGS. 3 and 4, has described operation of the embodiments of the present invention in the context of codecs. Commonly, codecs are provided as electronic devices. They can be embodied in integrated circuits, such as application specific integrated circuits, field programmable gate arrays and/or digital signal processors. Alternatively, they can be embodied in computer programs that execute on personal computers, notebook computers or computer servers. Similarly, decoders can be embodied in integrated circuits, such as application specific integrated circuits, field programmable gate arrays and/or digital signal processors, or they can be embodied in computer programs that execute on personal computers, notebook computers or computer servers. Decoders commonly are packaged in consumer electronics devices, such as gaming systems, DVD players, portable media players and the like and they also can be packaged in consumer software applications such as video games, browser-based media players and the like. And, of course, these components may be provided as hybrid systems that distribute functionality across dedicated hardware components and programmed general purpose processors as desired.

We claim:

1. A computer-implemented method comprising,
   at a decoder embodied in a computer program and having a plurality of filters available for filtering decoded video data arranged in a predetermined sequence where an output of each previous filter feeds into an input of each subsequent filter:
   decoding a reference frame of video data received via a channel;
   identifying, from first metadata received in the channel, a first filter selection that identifies a selection from among the available filters that is to be applied during decoding of the reference frame of video data for use as a reference for decoding subsequent video data from the channel, the first filter selection varying for different received frames of video data using a processing device;
   saving a first output from the identified filter for the reference frame of received video data in a reference buffer storing reference data used during decoding;
   identifying, from second metadata, separate from the first metadata, received in the channel, a second filter selection that identifies a selection from among the available filters that is to be applied during decoding of the reference frame of video data for use in displaying the decoded reference frame of video data, the filter varying for different received frames of video data using a processing device;
   saving a second output from the identified filter for the reference frame of received video data in a display buffer storing decoded video data to be displayed;
   outputting to a display the saved second output; and
   decoding subsequently received frames of video data using the saved first output as reference data.

2. The computer-implemented method of claim 1, wherein the first metadata identifies that the first filter selection is no filter.

3. The computer-implemented method of claim 1, wherein the second metadata identifies that the second filter selection is no filter.

4. The computer-implemented method of claim 1, wherein the reference buffer and the display buffer are two distinct buffers.

5. The computer-implemented method of claim 1, wherein the reference buffer and the display buffer are part of a single buffer.

6. The computer-implemented method of claim 5, further comprising storing the video data from the identified filters in the single buffer.

7. The computer-implemented method of claim 6, further comprising:
   linking respective video data stored in the single buffer to either reference data for prediction or display data for display; and
   retrieving the respective data for prediction and for display from the single buffer through the linking.

8. The computer-implemented method of claim 1, further comprising, when the second filter selection is positioned later in the plurality of filters than the first filter selection:
   routing a copy of the decoded video data outputted by the filter indicated by the first filter selection to the display buffer;
   processing the decoded video data outputted by the filter indicated by the first filter selection through any remaining filters in the plurality of filters until the filter indicated by the second filter selection; and
   outputting the decoded video data filtered by the filter indicated by the second filter selection to the display.

9. A processor comprising:
   a plurality of sequential filters, where an output of each previous filter feeds into an input of each subsequent filter;
   a decision unit for:
   identifying, from first metadata received via a channel, a first filter selection that identifies a selection from among available filters that is to be applied during decoding of a reference frame of video data for use as a reference for decoding subsequent video data from the channel, the first filter selection varying for different received frames of video data using a processing device, and identifying, from second metadata, separate from the first metadata, received in the channel, a second filter selection that identifies a selection from among the available filters that is to be applied during decoding of the reference frame of video data for use in displaying the decoded reference frame of video data, the second filter varying for different received frames of video data using a processing device;

a reference buffer for storing reference data;

a transformer for applying one or more additional transformations to the second output to produce a transformed second output;

a processing device for routing the first output to the reference buffer and routing the transformed second output to a display buffer; and a decoder for decoding subsequent items of video data based on the reference data stored in the reference buffer.

10. The processor of claim 9, wherein the first metadata identifies that the first filter selection is no filter.

11. The processor of claim 9, wherein the second metadata identifies that the second filter selection is no filter.

12. The processor of claim 9, wherein the reference buffer and the display buffer are two distinct buffers.

13. The processor of claim 9, wherein the reference buffer and the display buffer are part of a single buffer.

14. The processor of claim 13, wherein the decision unit further:

links respective video data stored in the single buffer to either reference data for prediction or display data for display; and causes retrieving of the respective data for prediction and for display from the single buffer through the links.

15. A non-transitory computer readable medium comprising instructions that, when executed on a processing device, cause:

at a decoder embodied in a computer program and having a plurality of filters available for filtering decoded video data arranged in a predetermined sequence where an output of each previous filter feeds into an input of each subsequent filter:

decoding a reference frame of video data received via a channel;

identifying, from first metadata received in the channel, a first filter selection that identifies a selection from among the available filters that is to be applied during decoding of the reference frame of video data for use as a reference for decoding subsequent video data from the channel, the first filter selection varying for different received frames of video data using a processing device;

saving a first output from the identified filter for the reference frame of received video data in a reference buffer storing reference data used during decoding;

identifying, from second metadata, separate from the first metadata, received in the channel, a second filter selection that identifies a selection from among the available filters that is to be applied during decoding of the reference frame of video data for use in displaying the decoded reference frame of video data, the filter varying for different received frames of video data using a processing device;

saving a second output from the identified filter for the reference frame of received video data in a display buffer storing decoded video data to be displayed;

outputting to a display the saved second output; and decoding subsequently received frames of video data using the saved first output as reference data.

16. The non-transitory computer readable medium of claim 15, wherein the first metadata identifies that the first filter selection is no filter.

17. The non-transitory computer readable medium of claim 15, wherein the second metadata identifies that the second filter selection is no filter.

18. The non-transitory computer readable medium of claim 15, wherein the reference buffer and the display buffer are two distinct buffers.

19. The non-transitory computer readable medium of claim 15, wherein the reference buffer and the display buffer are part of a single buffer.

20. The non-transitory computer readable medium of claim 19, wherein the instructions further cause storing the outputted video data from the identified filters in the single buffer.

* * * * *